No. 843,652. PATENTED FEB. 12, 1907.
F. G. WISELOGEL.
SLOP DRIER.
APPLICATION FILED OCT. 8, 1906.
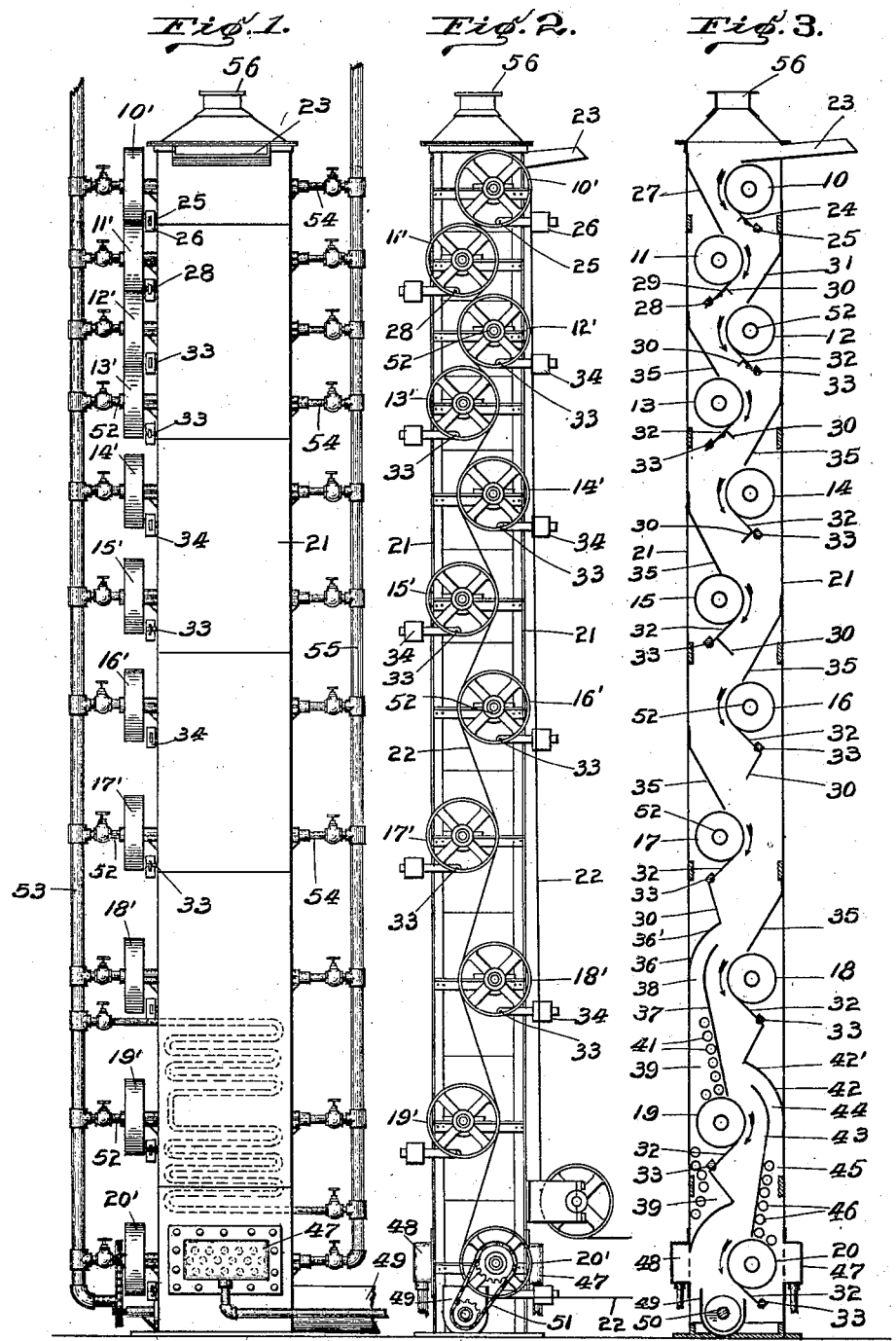
Inventor
Frederick G. Wiselogel

UNITED STATES PATENT OFFICE.

FREDERICK G. WISELOGEL, OF INDIANAPOLIS, INDIANA, ASSIGNOR TO UNITED STATES CONSTRUCTION AND UTILIZATION COMPANY, OF ROCHESTER, NEW YORK, A CORPORATION OF NEW YORK.

SLOP-DRIER.

No. 843,652.   Specification of Letters Patent.   Patented Feb. 12, 1907.

Application filed October 8, 1906. Serial No. 338,067.

*To all whom it may concern:*

Be it known that I, FREDERICK G. WISELOGEL, a citizen of the United States, residing at Indianapolis, in the county of Marion and State of Indiana, have invented certain new and useful Improvements in Slop-Driers, of which the following is a specification.

The object of my invention is to produce an efficient and easily-operated mechanism by which slops of any kind, especially garbage-slops, may be quickly and thoroughly dried.

The accompanying drawings illustrate my invention.

Figure 1 is a side elevation; Fig. 2, an end elevation of the driving end, and Fig. 3 a central vertical section.

In the drawings, 10, 11, 12, 13, 14, 15, 16, 17, 18, 19, and 20 indicate rotary drums, smooth upon their peripheries, each provided with a hollow shaft journaled in packed bearings carried by shell 21, as clearly shown in Fig. 1. The drums are rotated in the directions indicated by the arrows thereon by means of driving-pulleys 10', 11', 12', 13', 14', 15', 16', 17', 18', 19', and 20', respectively, and a driving-belt 22 is passed around said pulleys in the usual way. The drums 10 to 20, inclusive, are spaced vertically at varying distances from top to bottom of the casing 21, and leading into said casing immediately above the upper drum 10 is a feed-spout 23, through which the slops are introduced. The slops fall from spout 23 onto drum 10 and are carried around said drum and scraped off the periphery thereof by a scraper 24, which is carried by a rock-shaft 25, provided at one end with a weighted lever 26, which serves to hold the free end of the lever in constant contact with the periphery of the drum 10. Adjacent drum 10 is a downwardly-inclined baffle-plate 27, which deflects material dropping from drum 10 onto the next lower drum 11. Mounted below drum 11 on the rock-shaft 28 is a scraper 29, which also carries a deflecting-wing 30, which serves to deflect material scraped from drum 11, so that it may fall upon drum 12. Adjacent drum 11 is a baffle-plate 31, which also serves to direct material onto the drum 12. Beneath drum 12 is a scraper 32, carried by rock-shaft 33. Each succeeding drum is provided with a scraper 32, held in engagement with its periphery by means of a rock-shaft 33 and weighted levers 34, and each of said scrapers carries a deflecting-wing 30, which serves to direct material scraped from the drum so that it may fall upon the next lower drum. Baffle-plates 35 are also placed adjacent each drum so as to direct material to the next lower drum, as clearly shown in Fig. 3. The drums 17, 18, 19, and 20 are spaced a considerable distance apart, as clearly shown, and opposite the drum 18 the baffle-plate 36 instead of joining the side wall of the casing at its upper end lies some distance therefrom and is formed with an inwardly-curved lip 36'. Adjacent this lip is a deflector-plate 37, which, with the lip 36', forms an air-chamber 38, which leads from the chamber 39, formed between plate 36 and the side wall of the casing 21, this chamber extending down past drum 19. Mounted in this chamber 39 is a coil of steam-pipes 41, which heat the incoming air and plate 36. Adjacent drum 19 and extending therefrom down toward drum 20 is a deflector baffle-plate 42, similar to plate 36 and provided with an inturned lip 42', which serves, together with a curved deflector-plate 43, to form an air-channel 44, which leads from the upper end of an air-chamber 45, in which is mounted a coil 46. Air-chambers 47 and 48 are mounted at the lower end of casing 21 and communicate through perforations with the interior of the casing adjacent drum 20 and also with chambers 45 and 39, respectively. Drum 20 lies immediately above a conveyer-spout 49, in which is mounted any desirable form of conveyer, such as a worm conveyer 40, driven by a belt 51 from the shaft of the lower drum 20.

Leading into each hollow shaft of the drums 10 to 20, inclusive, is a stream-inlet pipe 52, all of which is connected to a suitable supply-pipe 53. Leading from the opposite end of each of said hollow shafts is a discharge-pipe 54, which pipes connect to a suitable discharge-pipe 55. Steam is admitted through the pipes 52 into each of the drums 10 to 20, inclusive, and maintain said drums at any desired temperature. Leading from the upper end of casing 21 is a suitable discharge-pipe 56, which may be connected to any suitable means, such as a furnace, for disposing of the noxious gases which may arise during the operation. A blast of heated air is maintained through chambers 47 and 48 by any suitable means.

In operation the several drums are rotated in the directions indicated by the arrows and the blast of hot air directed through chambers 47 and 48, so as to provide for an upward-moving blast of air which passes around the several drums. A complete circulation of hot air around all side of the drums above drum 17 being allowed by reason of the fact that the baffle-plates 27, 31, and 35 do not come directly down to the drum next below. The slops are then introduced through spout 23, and these slops fall successively from the upper drums to the drum next below, which drums, because of their heated condition, owing to the steam therein, serve to dry the slops the upward current of heated air carrying the vapors away, while the residuum passes gradually to the bottom of the apparatus. By the time the residuum has reached drum 20 and has been scraped therefrom it has been robbed of all of its free moisture, so as to be practically dry, and is discharged by the worm conveyer 50 in a form easily handled.

I claim as my invention—

1. A drier consisting of a plurality of rotary drums arranged in vertical series, and spaced at gradually-increasing intervals from top to bottom, scrapers arranged adjacent said drums, and means for heating said drums.

2. A drier consisting of a plurality of rotary drums arranged in vertical series, and spaced at gradually-increasing intervals from top to bottom, scrapers arranged adjacent said drums, means for heating said drums, and means for admitting an upward current of air around the drums during the downward passage of the drying material.

3. A drier consisting of an inclosing casing, a plurality of rotary drums arranged therein in vertical series, means for heating said drums, a scraper arranged adjacent each drum, and deflector-plates for deflecting material scraped from one drum upon the next lower drum.

4. A drier consisting of an inclosing casing, a plurality of rotary drums arranged therein in vertical series, means for heating said drums, a scraper arranged adjacent each drum, deflector-plates for deflecting material scraped from one drum upon the next lower drum, and means for permitting the injection of a blast of air into the lower end of said casing.

5. A drier consisting of an inclosing casing, a plurality of rotary drums arranged therein in vertical series, means for heating said drums, a scraper engaging each drum, deflectors arranged above the lower drums, and means for heating some of the lower deflectors.

6. A drier consisting of an inclosing casing, a plurality of rotary drums arranged therein in vertical series, means for heating said drums, deflectors arranged above the lower drums, and means for heating some of the lower deflectors.

7. A drier consisting of an inclosing casing, a plurality of rotary drums arranged therein in vertical series means for heating said drums, a scraper engaging each drum, deflectors arranged above the lower drums, an air-chamber formed behind some of the lower deflectors, heating means arranged in the air-chamber for heating the chamber, and the deflector, and means for permitting a flow of air through said air-chamber and thence upward through the casing through the downwardly-flowing material.

8. A drier consisting of an inclosing casing, a plurality of rotary drums arranged therein in vertical series, means for heating said drums, a scraper engaging each drum, deflectors arranged above the lower drums, an air-chamber formed behind some of the lower deflectors, heating means arranged in the air-chamber for heating the chamber, and means for permitting a flow of air through said air-chamber and thence upward through the casing through the downwardly-flowing material.

In witness whereof I have hereunto set my hand and seal, at Indianapolis, Indiana, this 20th day of September, A. D. 1906.

FREDERICK G. WISELOGEL. [L. S.]

Witnesses:
ARTHUR M. HOOD,
THOMAS W. MCMEANS.